United States Patent [19]
Loiseaux et al.

[11] Patent Number: 5,946,114
[45] Date of Patent: *Aug. 31, 1999

[54] OPTICAL FILTERING DEVICE AND APPLICATION TO A LIQUID CRYSTAL PROJECTOR

[75] Inventors: Brigitte Loiseaux, Villebon Sur Yvette; Cécile Joubert; Jean-Pierre Huignard, both of Paris, all of France

[73] Assignee: Thomson-CSF, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/596,137
[22] PCT Filed: Jun. 17, 1994
[86] PCT No.: PCT/FR94/00733
  § 371 Date: Feb. 16, 1996
  § 102(e) Date: Feb. 16, 1996
[87] PCT Pub. No.: WO95/35486
  PCT Pub. Date: Dec. 28, 1995

[51] Int. Cl.$^6$ .............. G02B 5/32; G02F 1/1335
[52] U.S. Cl. .................. 359/15; 349/5; 349/8; 349/104; 349/105
[58] Field of Search .............. 359/15, 1; 349/5, 349/7, 8, 9, 10, 104, 105, 116; 348/751, 752; 356/346

[56] References Cited

U.S. PATENT DOCUMENTS

| | | | |
|---|---|---|---|
| 4,752,130 | 6/1988 | George | 356/334 |
| 5,181,054 | 1/1993 | Nicolas et al. | 353/20 |
| 5,229,874 | 7/1993 | Lehureau et al. | |
| 5,245,449 | 9/1993 | Ooi et al. | 349/9 |
| 5,247,343 | 9/1993 | Burch | 356/346 |
| 5,272,496 | 12/1993 | Nicolas et al. | 353/34 |
| 5,347,380 | 9/1994 | Lehureau | |
| 5,392,181 | 2/1995 | Lehureau et al. | 360/114 |
| 5,410,421 | 4/1995 | Huignard et al. | 359/15 |
| 5,539,544 | 7/1996 | Paih et al. | 359/24 |
| 5,546,200 | 8/1996 | Nicolas et al. | 359/15 |

FOREIGN PATENT DOCUMENTS

| | | |
|---|---|---|
| 0 383 464 | 8/1990 | European Pat. Off. |
| 221401 | 1/1990 | Japan .............. G11B 5/008 |

OTHER PUBLICATIONS

Patent Abstracts of Japan, vol. 12, No. 411 (P–779), Oct. 31, 1988, JP–A–63–147135, Jun. 20, 1988.

*Primary Examiner*—Cassandra Spyrou
*Assistant Examiner*—Audrey Chang
*Attorney, Agent, or Firm*—Oblon, Spivak, McClelland, Maier & Neustadt, P.C.

[57] ABSTRACT

This optical filtering device includes a dichroic separator on the path of a light beam to be processed. According to the invention, it also includes a holographic filtering device situated in series with the separator on the path of the same beam. The holographic device can be oriented so as to adjust the angle of incidence of the beam and hence adjust its range of filtering wavelengths.

18 Claims, 8 Drawing Sheets

| KIND OF FILTERING | CHROMATIC COORDINATES OF GREEN x/y | EFFICACY FOR D65 WHITE (R) |
|---|---|---|
| TYPE 1: IDEAL | 0.279/0.695 | 8.8% |
| TYPE 2: 15 nm OFFSET | 0.331/0.650 | 8.6% |
| TYPE 3: ACHIEVED | 0.229/0.667 | 8.5% |
| TYPE 4: CORRECTION BY HCC | 0.284/0.691 | 8.6% |

CHROMATIC COORDINATES OF
THE TV STANDARD GREEN: 0.29/0.60

*FIG. 6*

| | GREEN BAND x/y | EFFICIENCY FOR D65 |
|---|---|---|
| TYPE 2 FILTERING | 0.331/0.650 | 8.6% |
| TYPE 2 + TYPE 4 FILTERING | 0.284/0.691 | 8.6% |

*FIG. 8*

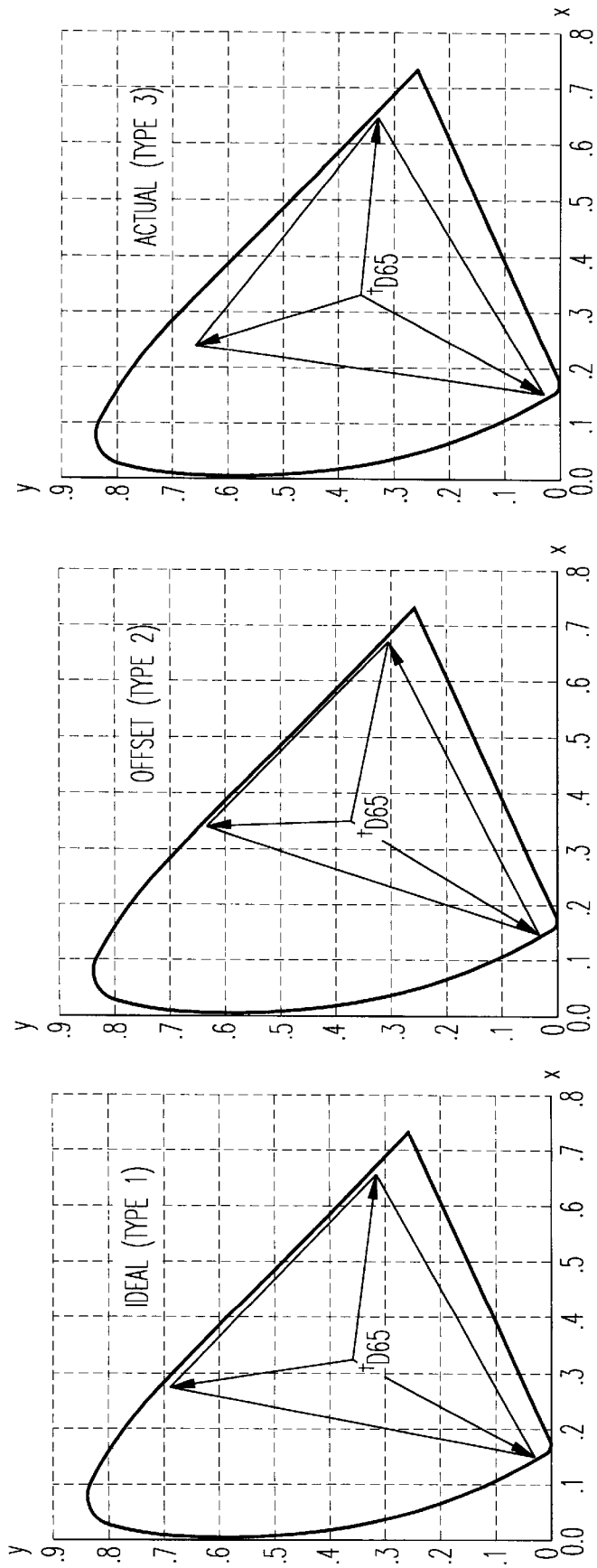

OPTICAL FILTERING DEVICE AND APPLICATION TO A LIQUID CRYSTAL PROJECTOR

The invention relates to an optical filtering device and its application to a liquid crystal projector, making it possible in particular to carry out chromatic correction.

Television is presently moving towards the presentation of images of large size and high resolution (HDTV format). The liquid crystal projector constitutes one of the solutions currently being developed to satisfy these needs.

These devices operate on the same principle as a slide projector in which the slide has been replaced by a liquid crystal valve. They generally comprise three cells, one for each of the primary colors (red, green, blue) originating from the same source of white light. The objective being to produce a good quality image, the principal criteria for evaluating the image will be the following:

brightness resolution and gray levels colorimetry.

The obtaining of trichromatic coordinates which are as saturated as possible will make it possible to increase the number of tones restored in the image and thus to approach the calorimetric content encoded during filming. This problem constitutes one of the important parameters to be taken into account when defining the architecture of liquid crystal projectors and choosing lighting sources.

One of the principal limitations of liquid crystal projection devices is imposed by the illumination device. This limitation originates in part from the narrow choice of white sources which are compatible with this application. In effect, the white sources must at one and the same time satisfy criteria of high luminous efficacy, stability of their colorimetry, long lifetime, as well as imperatives of cost. At present, arc lamps of metal halide type appear to constitute the best compromise in respect of these criteria.

These arc lamps, developed more especially for cinema projection, exhibit excellent colorimetry for this application, since its chromatic x/y coordinates are very close to those of the reference "WHITE" of the television standard (denoted D65 such that x=0.313; y=0.329).

Nevertheless, in order to be able to be used in a liquid crystal projector it is necessary to carry out chromatic separation of the emission from the source. This function is performed with the aid of dichroic mirrors (DM) whose typical spectral transmission curves are given in FIG. 2. Their characteristics will be chosen so as to obtain the lighting of the liquid crystal cell by primary colors which are as close as possible to the TV signal coding standard.

The notable differences in the spectral characteristics of the radiation emitted by metal halide lamps (FIG. 3) make it necessary to specify the set of dichroic mirrors to be used for each type of lamp. One of the difficulties to be solved originates from the correct filtering of the following spectral bands:

blue-green: 475–515 nm yellow: 565–600 nm comprising in particular a very strong mercury emission line close to 570 nm.

In fact the low-pass or high-pass dichroic functions which satisfy this application require high accuracy in regard to:

the cutoff frequency the slope of the spectral filtering.

The standard accuracy for carrying out these functions, typically 15 nm, will enable acceptable colorimetry to be obtained only at the price of a loss of flux by underdimensioning these dichroic mirrors. The production of filters meeting the required specifications (accuracy of about 5 nm in the cutoff frequency) would entail, on the one hand, high cost and, on the other hand, a poorer luminous balance, their transmission being poorer.

SUMMARY OF THE INVENTION

The invention therefore relates to an optical filtering device comprising a dichroic separator situated on the path of a beam to be filtered, characterized in that it includes a holographic filtering device also situated on the path of the beam to be filtered.

The invention also relates to a liquid crystal projector applying the device, characterized in that it includes:

a source emitting in a range of wavelengths comprising several primary wavelengths of the range of colors;

at least one holographic filtering device eliminating the unwanted wavelengths;

at least one dichroic separator separating the wavelength ranges corresponding to wavelength ranges of different primary colors;

one spatial light-modulating cell per range of primary color wavelengths for modulating each beam of a primary wavelength;

at least one device for combining the various modulated beams.

The various subjects and characteristics of the invention will emerge more clearly from the description which follows and from the attached figures which represent:

BRIEF DESCRIPTION OF THE DRAWINGS

FIG. 6, a table providing the characteristics of the various types of filtering of FIGS. 5a to 5c;

FIGS. 7a to 7c, the color charts for the filterings of type 1, 2 and 3 of FIGS. 5a to 5c;

FIG. 8, a table giving the filtering characteristics for the yellow spectral band with a device according to the invention;

DESCRIPTION OF THE PREFERRED EMBODIMENTS

Figure 1:
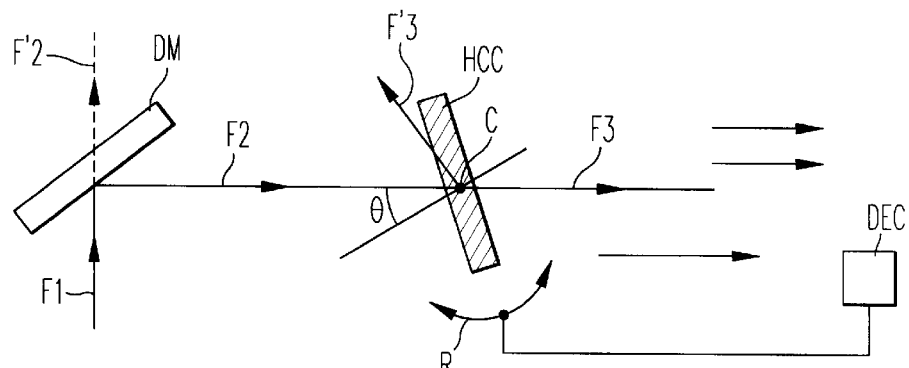
FIG. 1, a filtering device according to the invention.
Figure 2A:
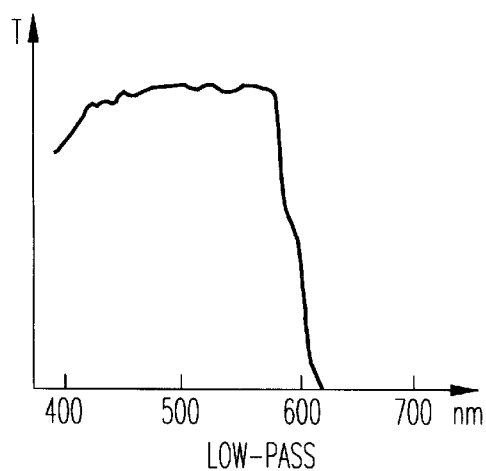
FIGS. 2a and 2b, typical examples of wavelength filtering.
Figure 2B:
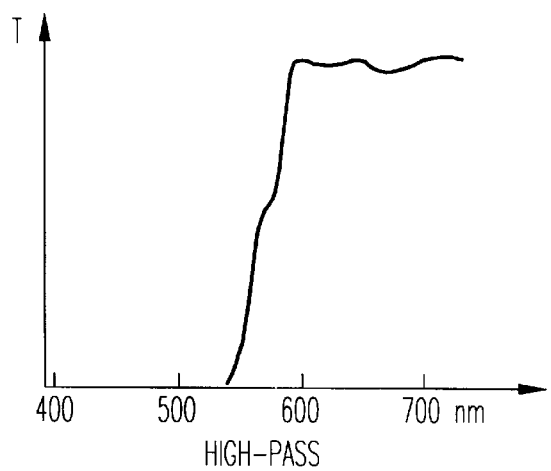

Referring to FIG. 1a, an optical filtering device according to the invention will firstly be described. This device includes a dichroic separation device or dichroic mirror DM and a holographic filtering device HCC. A light probe L provides a beam F1 to be filtered which is received by the dichroic mirror. The latter reflects the light F2 having a specified range of length and which is transparent to the light F'2 possessing a wavelength which is not contained within this range.

The selectivity of filtering of the dichroic mirror is limited and the characteristics of the source S can shift around within the wavelengths. The filtering may therefore turn out to be inadequate. The invention therefore provides for combining with the dichroic mirror a holographic filtering device HCC composed principally of a layer of photosensitive material in which at least one grating of strata has been recorded, making it possible to reflect the unwanted wavelengths (beam F'3) and to be transparent (beam F3) to the range of wavelengths which it is desired to obtain.

The filtering device HCC has been recorded so as to reflect certain unwanted lengths around the wavelength to be obtained. However, during the aging of the source its characteristics may change and there may be an unwanted change in its colorimetry. Similarly, the replacing of one source by another may lead to a beam F1 which exhibits different unwanted lengths. In both cases, in order to match the filtering, the HCC device is rotated with respect to the direction of the beam F2.

In fact, the diffraction in the HCC device obeys Bragg's law:

$$2n_0 \Lambda \sin \Theta = k\lambda$$

in which:

$\Lambda$ is the spacing of the inscribed interference fringes $n_0$ is the mean index of the HCC medium $\Theta$ is the angle of incidence of the beam F2 with the plane of incidence of the HCC device k is the order of diffraction $\lambda$ is the wavelength of the beam F2.

Once the grating has been inscribed, the spacing $\Lambda$ is fixed.

In order to change the diffracted wavelength it is therefore sufficient to change the angle of incidence $\Theta$ by rotating the HCC device about the axis O with the aid of means represented by the arrow R. According to the invention, a device for measuring the coordinates or calorimetric flux is also provided in the path of the beam F3, which detects any unwanted wavelength in the beam F3 and makes it possible to act on the means R in order to rotate the HCC device so as to obtain the diffraction of the unwanted wavelengths.

To obtain good reflection of the unwanted waves, the thickness d of the layer of photosensitive material will preferably be chosen to be greater than or equal to, or even markedly greater than, $n_0 \Lambda^2 / 2\pi\lambda$.

By way of example, a filtering device will be described which makes it possible to obtain the primary wavelength corresponding to green.

The HCC device is produced from materials such as indicated in the documents:

"Hologram recording with new photopolymer system" R. T. Ingman, H. L. Fielding, Opt. Eng. 24, 808 (1985);

"Hologram recording in Du Pont's new photopolymer materials" A. M. Weber, W. K. Smothers, T. J. Trout, D. J. Mickish, Practical Holography IV, SPIE Proceedings, 1212 (1990).

An illustrative embodiment of this type of component is proposed here, in materials such as bichromated gelatine or photopolymers whose index modulation characteristics are known to be broadly compatible with this application (upper limit of the material $\Delta n=0.08$).

Figure 3A:
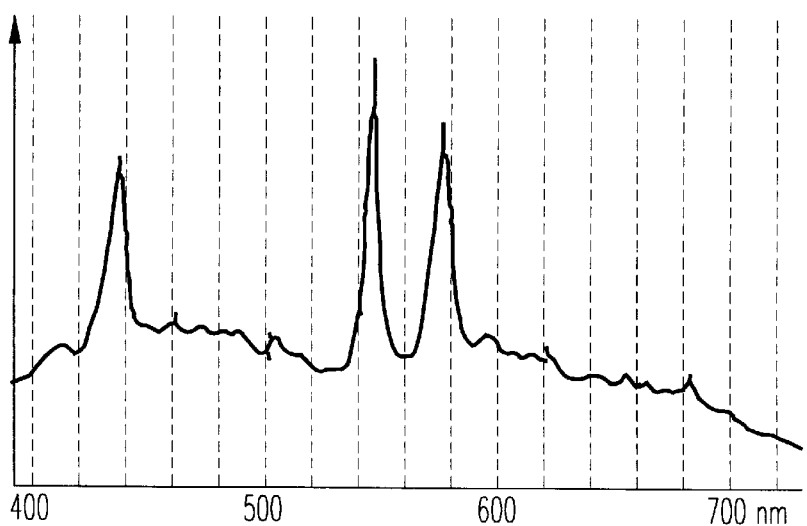
FIGS. 3a to 3c, metal halide type arc lamp emission spectra.
Figure 3B:
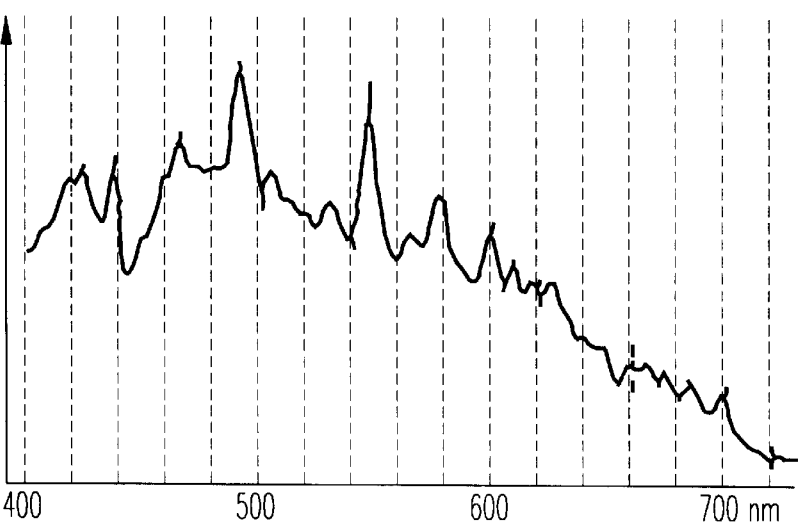

The case of the filtering of the yellow spectral band:

For example, if the source used possesses the spectral distribution of FIG. 3a, filtering of the yellow spectral band must be carried out.

Figure 5A:
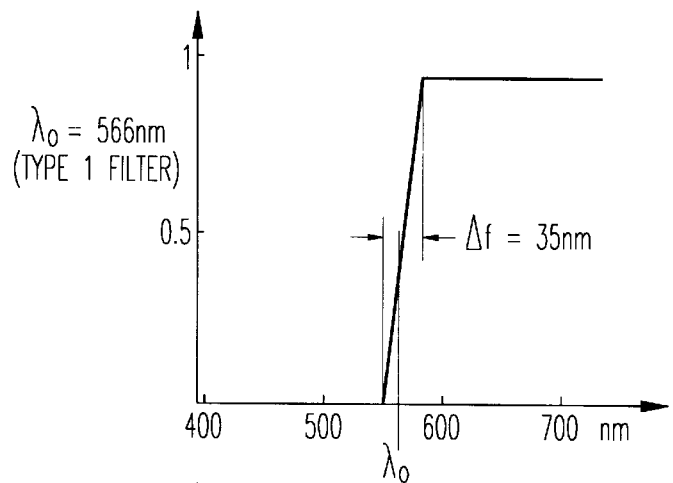
FIGS. 5a to 5d, examples of filtering of the yellow spectral band.
Figure 5B:
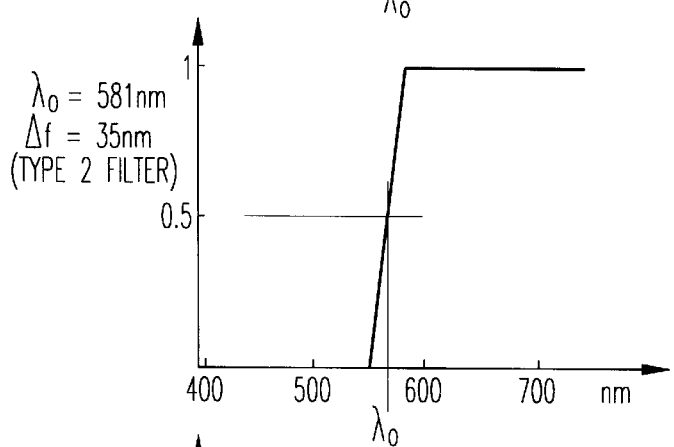
Figure 5C:
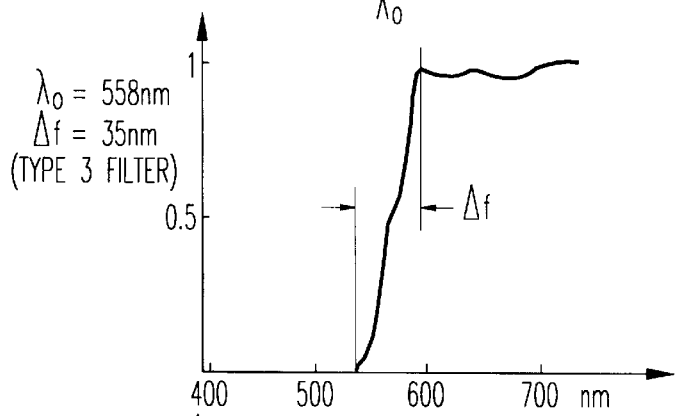
Figure 5D:
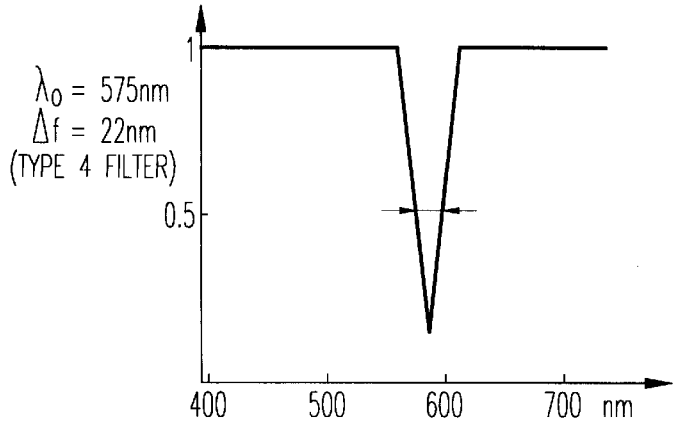

Ideal filtering between 515–565 nm of the green band by a filter set exhibiting a characteristic of the type of FIG. 5a (type 1 filter) leads to the chromatic x/y coordinates and luminous balance R which are given in the summary table presented in FIG. 6.

The balance R takes into account the corrections of weighting which are required to obtain the D65 reference "White".

However, there may be calorimetric deviations of for example 15 nm, with respect to the ideal filtering of FIG. 5a, and the results obtained for a filtering of type 2 (FIG. 5a) of the yellow band which exhibits a deviation of 15 nm with respect to the above ideal filtering (type 1) are given in the table of FIG. 6.

Figure 3C:
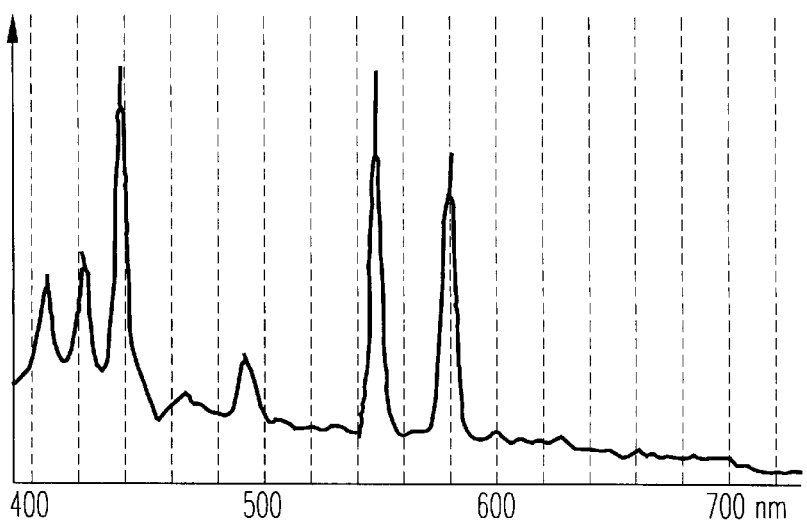
Figure 4:
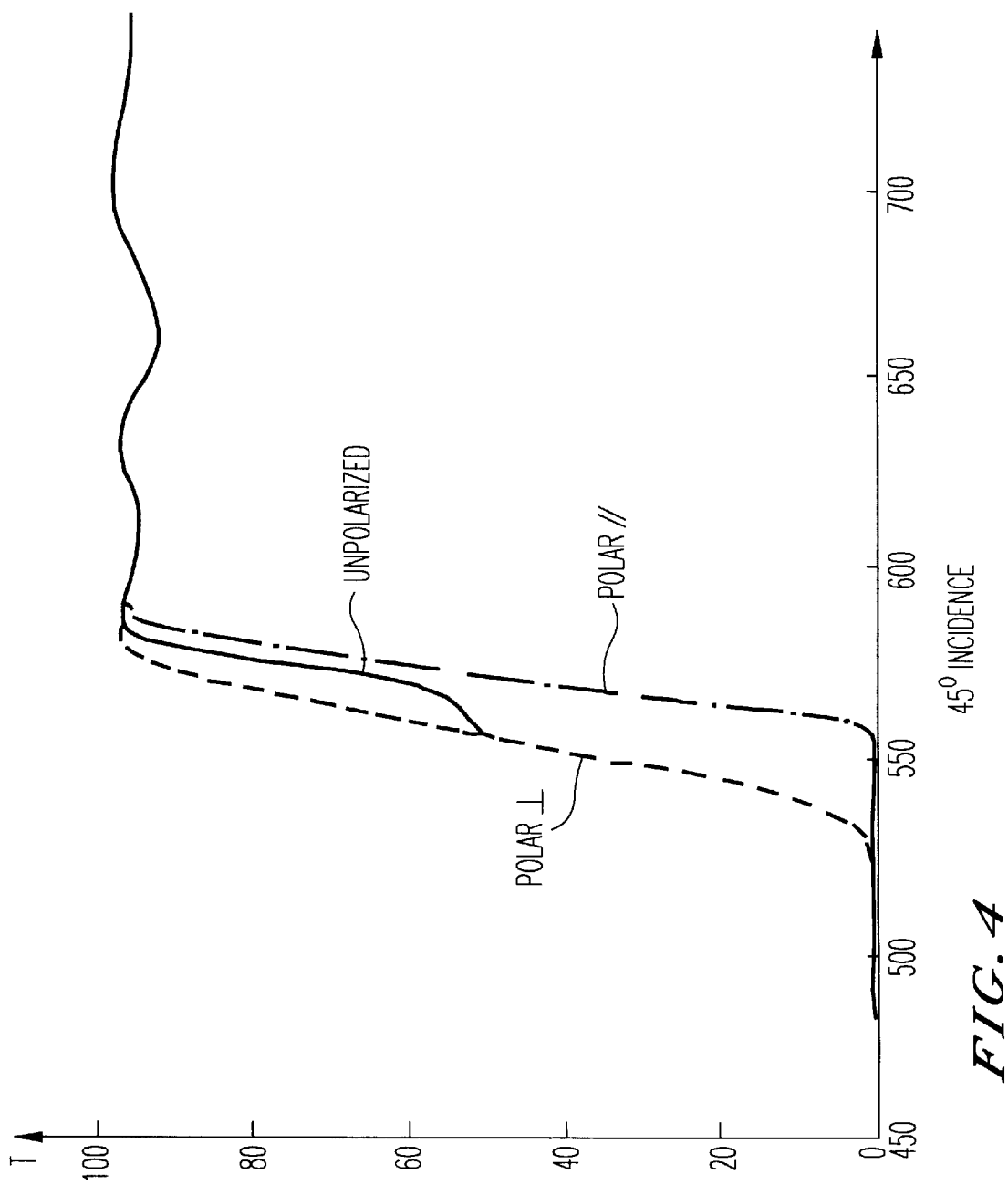
FIG. 4, diagrams demonstrating the influence of polarization on the reflectivity of the dichroic mirrors.

Actual filtering such as obtained with a filter (without the filtering device of the invention) whose characteristic is of type 3 as represented in FIG. 3c provides the chromatic coordinates indicated in FIG. 6 (type 3).

The color charts of these filterings represented in FIG. 7a, 7b, 7c, show clearly that the possible deviations with respect to ideal filtering considerably reduce the pallet of available colors and make corrections necessary in regard to the video signal in order to restore the correct dominant features of the video images.

According to the invention, there is provision for the use of a corrector filter (HCC) with the following characteristics:

filtering wavelength 575 nm width of the filtering at 3 dB 22 nm

16% transmission at 575 nm

98% mean transmission outside of the filtering.

The results presented in FIG. 8 show that, in the case of the type 2 filtering, the same primary features are re-established as those achieved with the ideal filtering of type 1. In this case, the luminous efficiencies remain equivalent.

Figure 9:
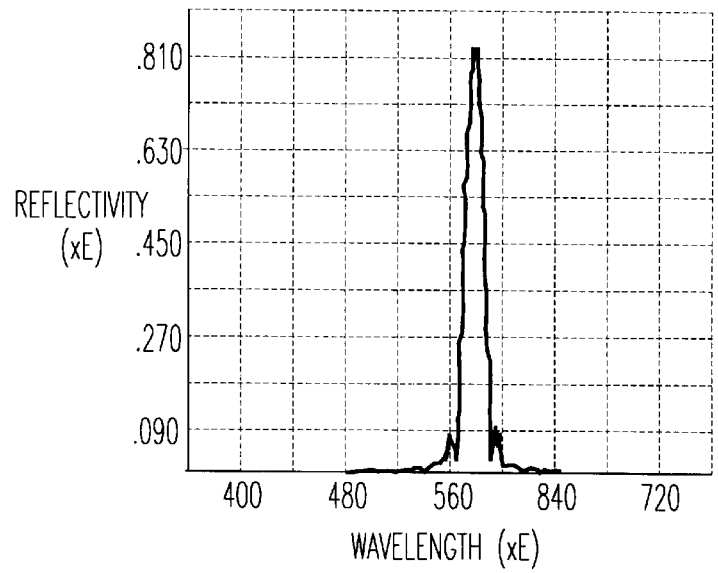
FIG. 9, an example of holographic filtering.
Figure 10:
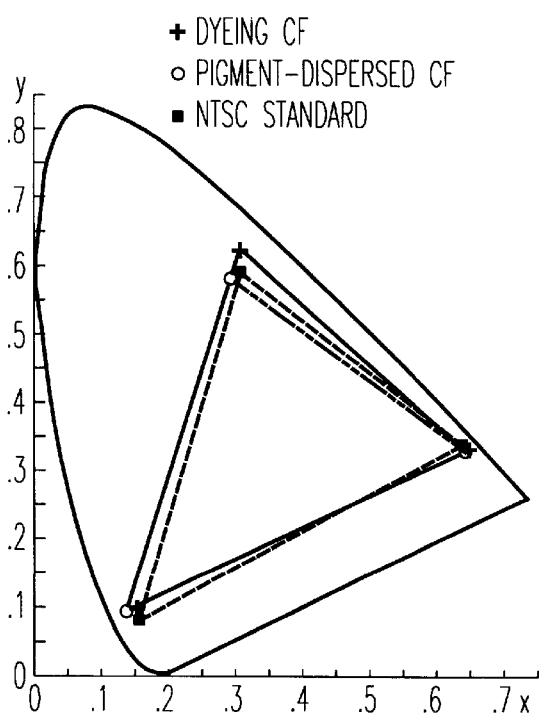
FIG. 10, a typical example of a color chart generated by a matrix of color filters which are known in the art.

An illustrative practical embodiment of this type of filter is given in FIG. 9 with a material having an index variation of 0.03 and a thickness operating at 5° Bragg incidence for the 575 nm wavelength.

It will be noted that the tolerances in angular positioning of this component are not severe:

This component when used at 7° incidence (optimal filtering for the 580 nm wavelength) leads to the same luminous balance and to a deviation of less than 1/1000 in the chromatic coordinates.

Figure 11:
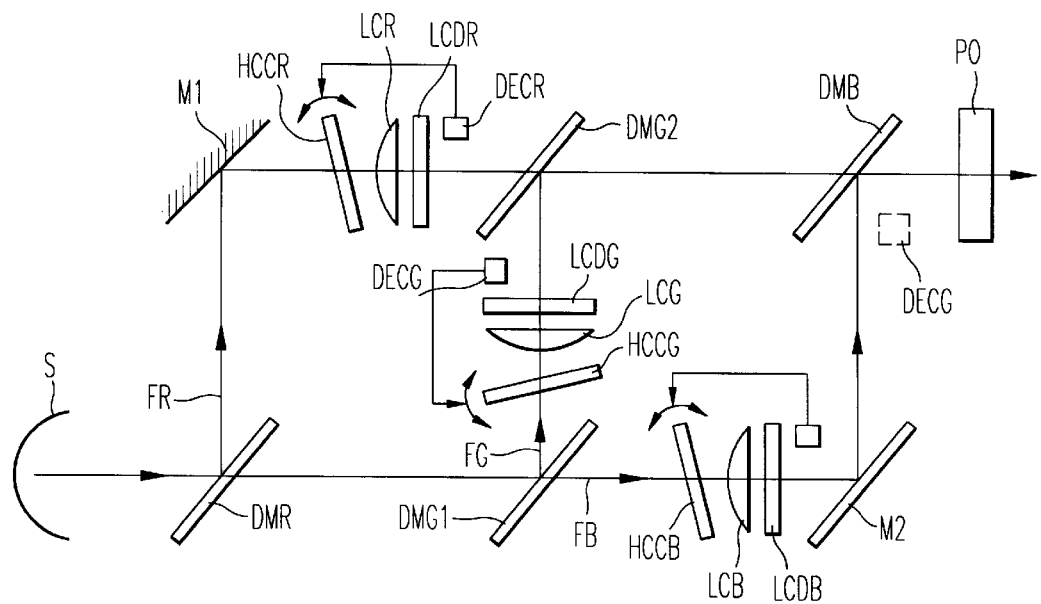
FIG. 11, an example of an embodiment of a correction device for a liquid crystal projector.

FIG. 11 represents an application of the filtering device according to the invention to the production of a color liquid crystal projector.

Such a projector must have one liquid crystal cell per primary color (red, green, blue).

Thus, in FIG. 11 are seen the cell LCDR for red, the cell LCDG for green, and the cell LCDB for blue. An optical focussing device LCR, LCG, LCB and a holographic filtering device HCCR, HCCG, HSSB are placed in series with each cell. Each assembly composed of a cell and a holographic filtering device receives a beam, in principle monochrome, within a given range of wavelengths. In FIG. 11, the holographic filtering devices are placed upstream of the crystal cells with respect to the direction of the light beams to be processed, but they could be placed downstream.

The various light beams are obtained, starting from a single source S, by separating various ranges of wavelengths contained in the emission spectrum of the source S and this is done with the aid of dichroic separators. Dichroic mirrors are used in FIG. 11. The dichroic mirror DMR receives the beam from the source S and reflects the light FR at wavelengths included within the wavelength range for red. The beam FR is sent by a mirror M1 to the holographic filtering device HCCR and the liquid crystal cell LCDR.

The light which is not reflected by the mirror DMR is transmitted to a second dichroic mirror DMG1 which reflects the light FG included within the wavelength range for green. The beam FG is sent by the holographic filtering device HCCG to the cell LCDG.

The light which is not reflected by the mirror DMG1 is transmitted to the holographic filtering device HCCB and to the cell LCDB.

The various holographic filtering devices/liquid crystal cell assemblies HCCR/LCDR, CCG/LCDG, HCCB/LCDB transmit the beams at the red, green and blue wavelengths respectively. These various beams are recombined by a dichroic plate DMG2 which reflects the green (combining of red and green) and by a dichroic plate which reflects the blue (combining blue with red and green).

A projection optics PO next makes it possible to project the color image resulting from the combining of the images displayed by the liquid crystal cells LCDR, LCDG, LCDB.

The architecture of the system of FIG. 11 has been given by way of example but any other arrangement could be provided for combining the beams of the various holographic filtering devices/liquid crystal cell assemblies.

Figure 12:
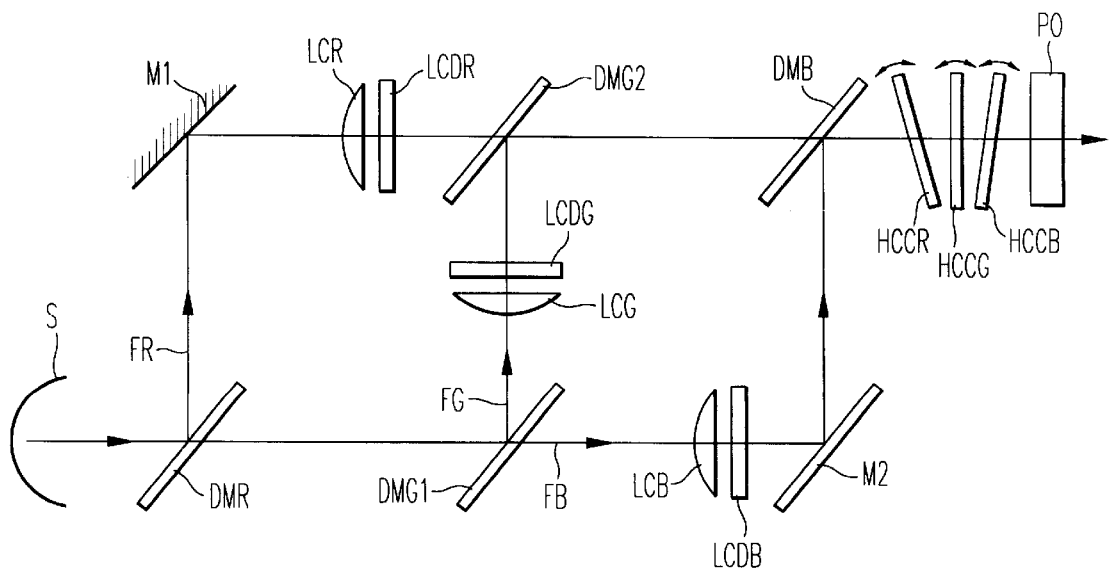
FIG. 12, a variant embodiment of the device of FIG. 11.

FIG. 12 represents another embodiment of the device of the invention in which the filtering devices HCCR, HCCG and HCCB are not associated with the liquid crystal cells LCDR, LCDG and LCDB but are grouped at the output of the device.

According to another variant embodiment, not represented, the devices HCCR, HCCG and HCCB could be provided between the source S and the first dichroic mirror DMR.

As was described in connection with FIG. 1, the holographic filtering devices HCCR, HCCG and HCCB can be oriented so as to modify the angle of incidence of each beam incident on the entrance face of each device HCCR, HCCG, HCCB and to modify the wavelength ranges for which there is diffraction in these devices.

According to the invention, colorimetric flux measuring devices DECR, DECB, DECG are provided after filtering, which detect the unwanted wavelengths and each consequently controls the orientation of the filtering devices HCCR, HCCB, HCCG (see FIG. 11).

According to one embodiment, for each colorimetric flux measuring device it is possible to use one detection element arranged on the active matrix of the corresponding liquid crystal cell (LCDR, LCDG, LCDB).

The detection devices can also be grouped together in a measuring device DECG as indicated with dashed lines in FIG. 11 or as represented in FIG. 12.

The holographic components required for chromatic correction are obtained by holographic recording of simple functions of mirror type and may be duplicated by optical copying means.

The constraints on their operating wavelength are reduced because the adjustment of the chromatic coordinates is achieved through the angular positioning of this component: the 5 nm precision is achieved with a tolerance of a few degrees in the angular positioning of the component.

The physical parameters of the component, index variation and thickness, determine the spectral width of the band to be filtered.

These components, of simpler technology, may also replace the dielectric multi-layer treatments of the field lenses which carry out part of these chromatic corrections.

This solution makes it possible to envisage a single-projector architecture using dichroic mirrors with standard characteristics, which is compatible with lighting sources exhibiting different kinds of spectral distributions.

These holographic correction components, when they operate in the vicinity of normal incidence, offer the advantage of having identical filtering characteristics for both polarization components. This therefore makes it possible to compensate, without loss of flux, for the deviations in spectral reflectivity which exist between the two polarization components inherent in the use of bichroic components at incidences >20°.

The projection device of the invention therefore makes it possible, through the use of color corrector holographic components, to adjust in a simple manner the chromatic coordinates of the three primaries R, G, B, of a liquid crystal projector.

This device is composed principally of a source of white light (S), of dichroic mirrors for separating primaries and holographic components intended for the chromatic corrections. The color image is next obtained by one of the means of the known art (front or back-projection) making it possible to recombine the images emerging from the three liquid crystal cells. The holographic correction components are used preferably in the vicinity of normal incidence and of the photoinduced phase structure type (modulation of the index of a medium a few tens of microns thick).

During aging of the lamps, alterations may appear in their calorimetric content. It may readily be envisaged that necessary corrections will be made by rotating the holographic components in the same way as gain corrections are performed in color cathode-ray tubes.

This type of feedback control has the advantage of also permitting the use of line spectrum sources or else three sources emitting narrow spectral lines. Indeed, the lack of relative stability between the luminances of these various lines currently constitutes one of the obstacles to their use as lighting source for liquid crystal projectors.

By ensuring primaries whose chromatic coordinates have the same dominant wavelengths as those of the encoding of the video signal, the number of electronic corrections to be performed before addressing the liquid crystal cells is reduced.

The chromatic correction device forming the subject of this patent can also be incorporated in a monochrome liquid crystal projector comprising a screen furnished either with color filters, or with holographic microlenses intended for the spatiochromatic focussing of the lighting source. Under these conditions, it is possible to overcome the principal drawback of monochrome devices, namely the lack of spectral purity in the primaries generated by the colored filters.

We claim:

1. A liquid crystal projection system comprising:
   an optical source configured to produce an optical beam;
   an optical filter comprising,
      a dichroic separator positioned in a path of the optical beam and configured to filter out a predetermined frequency band of said optical beam and produce a residual optical beam;
      a holographic filtering device positioned in the path of the optical beam, a filtering response characteristic of said holographic filter cooperating with said dichroic separator so as to further suppress the predetermined frequency band of the residual optical beam; and
      a variable filter adjustment mechanism configured to adjust an angle of said holographic filter device with respect to the path of the optical beam so as to adjust the filtering response characteristic and compensate for a change in colorimetry of said optical beam provided by said optical source; and an image display mechanism that projects at least a portion of said residual optical beam so as to display an image.

2. The optical filter of the system of claim 1, wherein:

said holographic filtering device comprises a photosensitive layer having a physical thickness being greater than $$n_0 \Lambda^2 / 2\pi \lambda$$

in which $n_0$ is a mean index of the photosensitive layer, $\Lambda$ is a spacing of respective interference fringes inscribed in the photosensitive layer, and $\lambda$ is a recording wavelength of the photosensitive layer corresponding to an unwanted wavelength to be refracted and removed from said optical beam.

3. The optical filter of the system of claim 1, wherein:

said holographic filtering device comprises at least one grating index recorded therein that diffracts a predetermined wavelength from said optical beam, and said adjustment mechanism further comprising, means for rotating the holographic filtering device with respect to said path of the optical beam and changing the wavelength to be removed from the optical beam by rotating the holographic filter.

4. The system according to claim 3, said adjustment mechanism further comprising a colorimetric flux and feedback system positioned downstream of said holographic filtering device, downstream being in a direction with respect to a propagation direction of the residual optical beam, said feedback system configured to detect the wavelength to be removed from the residual beam and provide a feedback signal to control said means for rotating.

5. The system of claim 1, wherein:

said optical beam having a range of wavelengths including plural primary wavelengths of a range of colors, said residual beam comprising a wavelength of a primary color;

said image display mechanism including, a spatial light-modulating cell positioned in a path of said residual optical beam and configured to modulate said wavelength of said primary color in said residual optical beam; and a combiner configured to combine an output from said spatial light-modulating cell with other optical beams;

said holographic filtering device being configured to suppress; and said dichroic separator being configured to separate said primary wavelengths into separate beams having generally separate wavelengths.

6. The system of claim 5, wherein said holographic filtering device comprises a photosensitive layer having a physical thickness being greater than $$n_0 \Lambda^2 / 2\pi \lambda$$

in which:

$n_0$ is a mean index of the photosensitive layer, $\Lambda$ is a spacing of respective interference fringes inscribed in the photosensitive layer, and $\lambda$ is a recording wavelength of the photosensitive layer corresponding to an unwanted wavelength to be refracted and removed from said optical beam.

7. The system of claim 5, wherein:

said holographic filtering device comprises at least one grating index recorded therein that diffracts a predetermined wavelength from said optical beam, and said adjustment mechanism further comprising, means for rotating the holographic filtering device with respect to said path of the optical beam and changing the wavelength to be removed from the optical beam by rotating the holographic filter.

8. The system of claim 7, said adjustment mechanism further comprising a calorimetric flux and feedback system positioned downstream of said holographic filtering device, downstream being in a direction with respect to a propagation direction of the residual optical beam, said feedback system configured to detect the wavelength to be removed from the residual beam and provide a feedback signal to control said means for rotating.

9. The system of claim 5, further comprising:

another dichroic separator, said dichroic separator and said another dichroic separator being configured to separate the optical beam into three beams, each of said three beams corresponding to a primary color, said spatial light-modulating cell in said holographic filtering device, being disposed in a path of at least one of said three beams, said another dichroic separator being positioned downstream of said dichroic separator with respect to a propagation direction of said optical beam.

10. The system of claim 9, wherein said holographic filtering device being placed upstream of said spatial light-modulating cell, upstream being in a direction of propagation of the optical beam in which said holographic filtering device and said spatial light-modulating cell are disposed.

11. The system of claim 5, wherein said holographic filtering device being positioned between said source and the dichroic separator.

12. The system of claim 11, wherein said holographic filtering device comprises a plurality of elementary devices corresponding to a range of wavelengths not included in wavelengths of said residual optical beam, said plurality of elementary devices including at least two holographic filters configured to suppress different frequencies.

13. The system of claim 5, wherein said holographic filtering device is disposed downstream of the combining device.

14. The system of claim 13, wherein the holographic filtering device comprises a plurality of elementary devices each of which corresponds to a range of wavelengths not included in said residual optical beam, said plurality of elementary devices including at least two holographic filters configured to suppress different frequencies.

15. The system of claim 5, wherein said holographic filtering device is oriented so as to modify an angle of incidence of the optical beam transmitted from the source onto an incident face of said holographic filtering device.

16. The system of claim 15, further comprising a colorimetric flux measuring device configured to detect a wavelength of a beam emerging from said holographic filtering device and configured to control an orientation of the holographic filtering device so as to eliminate a predetermined wavelength from the residual optical beam.

17. The system of claim 16, further comprising an active matrix of a liquid crystal cell, said active matrix comprising said colorimetric flux measuring device positioned at a downstream location in a propagation direction of said residual beam with respect to said holographic filtering device.

18. The system of claim 17, wherein said colorimetric flux measuring device comprises a detection element that replaces an image element of a liquid crystal cell, and is positioned downstream of said holographic filtering device.

* * * * *